Patented July 29, 1930

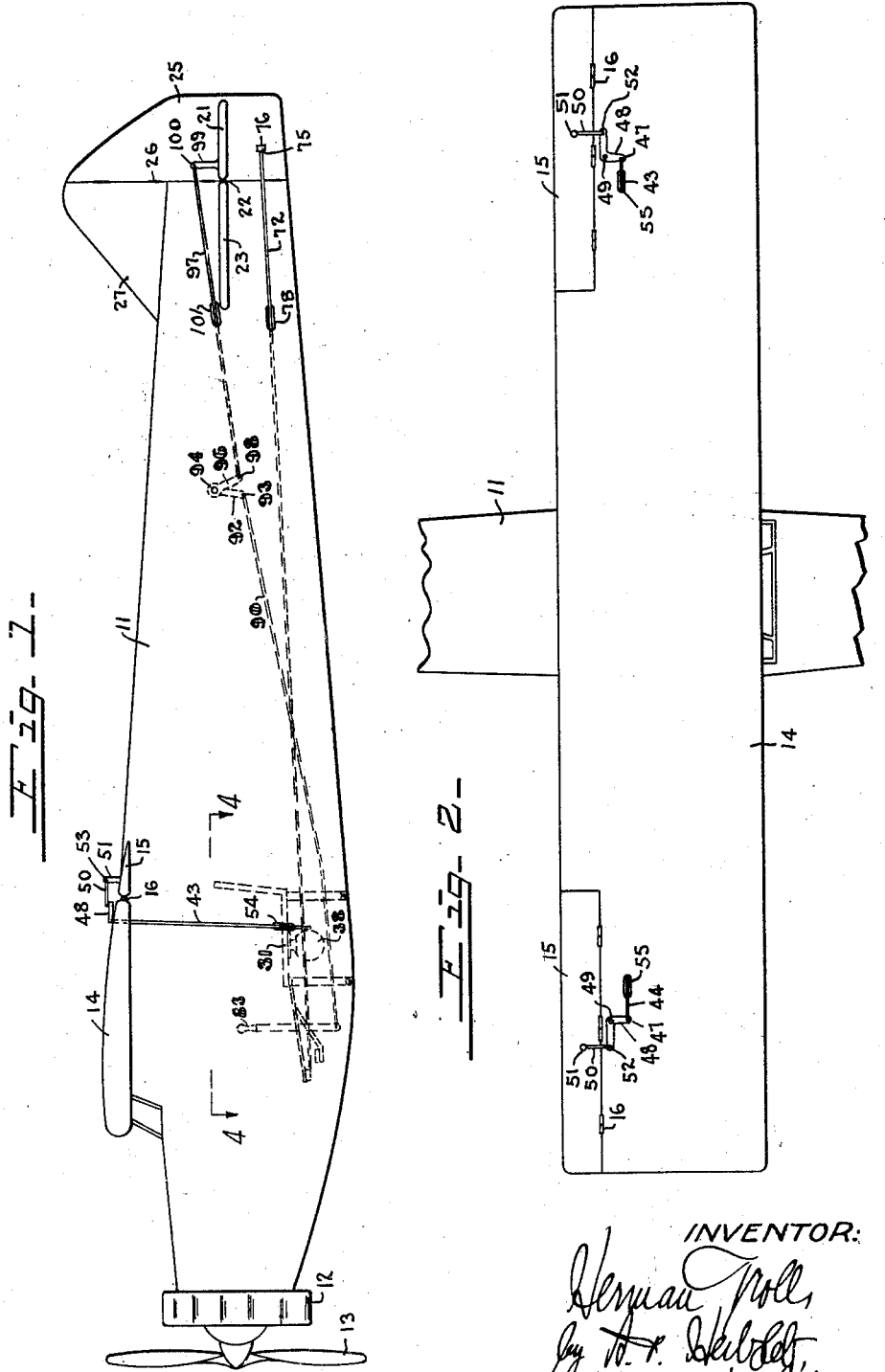

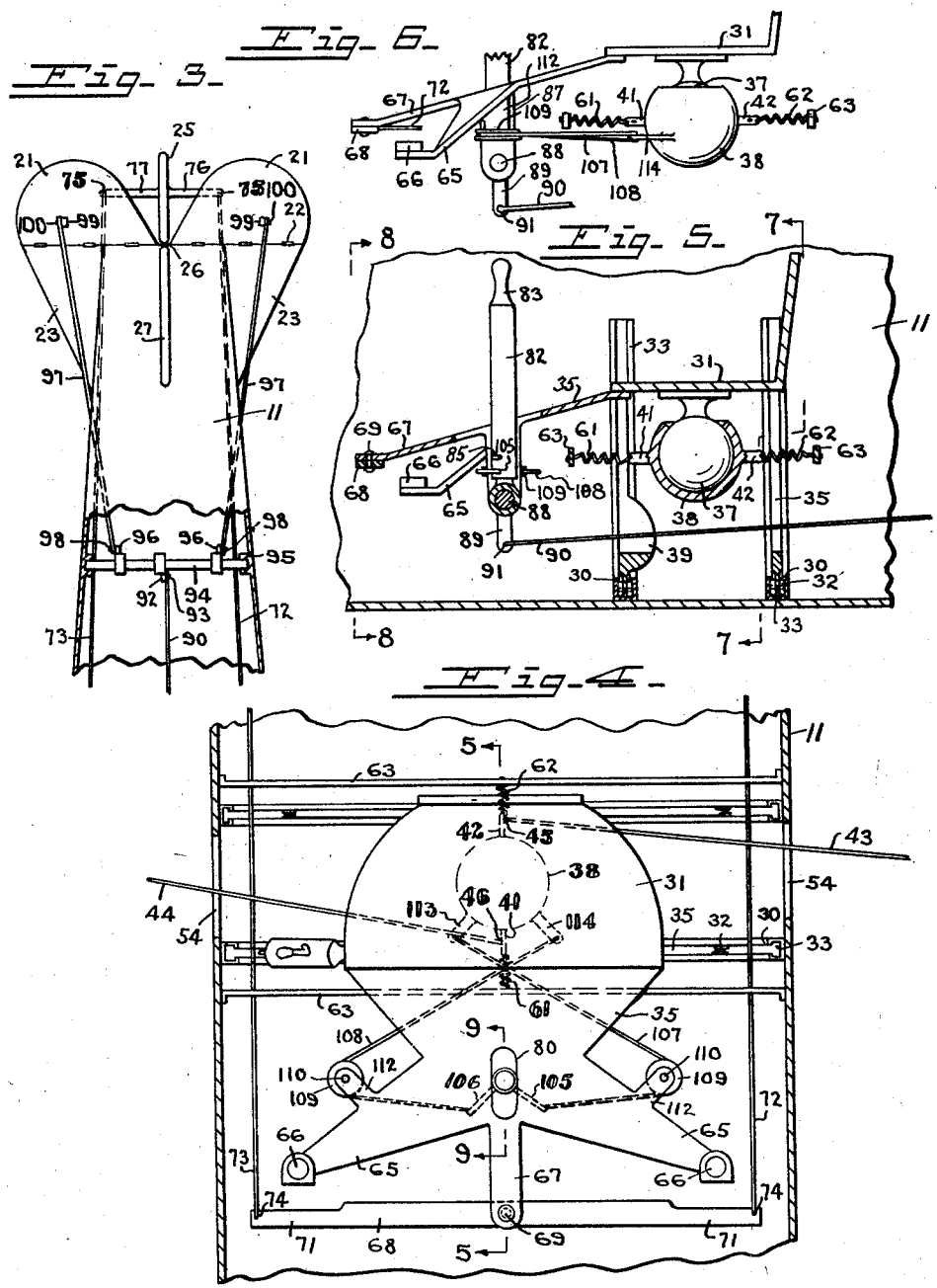

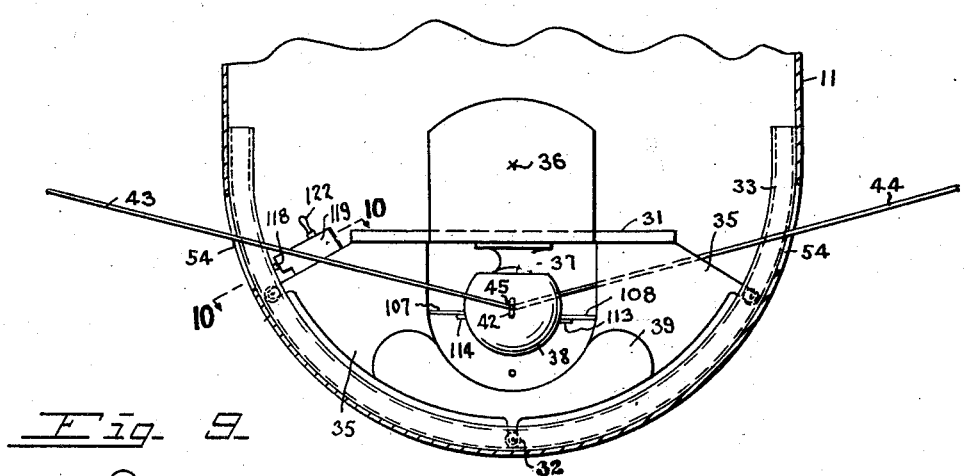
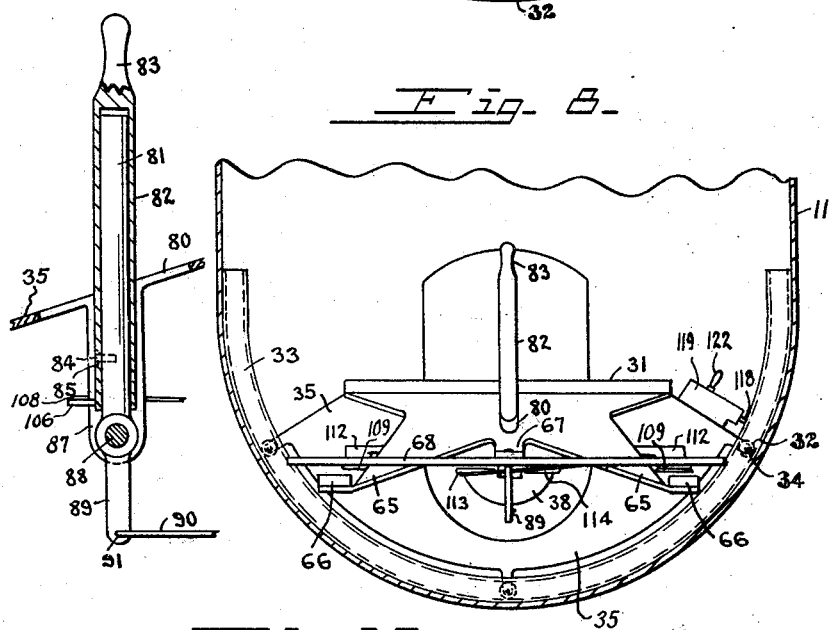
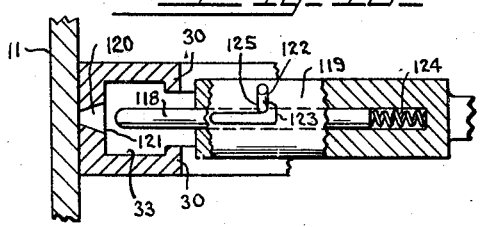

1,771,665

UNITED STATES PATENT OFFICE

HERMAN TROLL, OF NORWOOD, OHIO

AIRPLANE

Application filed May 16, 1929. Serial No. 363,419.

My invention relates to airplanes, and it is the object of my invention to provide means for automatically maintaining an airplane at a substantially level flight; further, to provide novel means for automatically returning an airplane to a substantially level position in its flight after a deviation from such position; further, to provide novel means for automatically controlling the flight of an airplane.

It is the object of my invention, further, to provide novel means whereby to selectively control the flight of an airplane manually and automatically; further, to provide novel means for automatically controlling the horizontal position of an airplane while leaving the elevation control and the lateral turning of the airplane under manual control; further, to provide novel control means for the flight of an airplane; and, further, to provide novel means for changing the control of an airplane from an automatic control to a manual control, and vice versa.

The invention will be further readily understood from the following description and claims, and from the drawings, in which:

Fig. 1 is a side elevation of an airplane embodying my invention.

Fig. 2 is a plan view of the same, partly broken away.

Fig. 3 is a plan view of the tail end of the airplane, partly broken away.

Fig. 4 is a plan view of my improved device, partly broken away, and partly in section on the line 4—4 of Fig. 1.

Fig. 5 is a vertical section of the same, taken on the line 5—5 of Fig. 4.

Fig. 6 is a side elevation of the seat portion of my improved device and the controls thereat, partly broken away.

Fig. 7 is a vertical cross-section of my improved device, taken in the plane of the line 7—7 of Fig. 5, and partly broken away.

Fig. 8 is a vertical cross-section of the same, taken in the plane of the line 8—8 of Fig. 5, and partly broken away.

Fig. 9 is an axial section of the manual control means, taken on the line 9—9 of Fig. 4; and, Fig. 10 is a sectional detail view, taken on the line 10—10 of Fig. 7.

The main frame of the airplane is represented at 11. The main frame may be termed a usual fuselage. The airplane is exemplified as a monoplane, driven by a single motor represented at 12, for driving a usual propeller represented at 13. The invention is applicable to other types of airplanes differently driven. The planes or wings exemplified are shown at 14.

The wings are respectively provided at their rear toward their outer portions with ailerons 15, which are hinged at their forward ends to the respective wings by hinges 16. Means are provided for swinging these ailerons in opposite directions, up or down, at the respective sides of the fuselage for tilting the airplane about a lengthwise axis out of level position or back into level position.

At the rear end of the frame there is an elevator 21, there being a section of the elevator at each side of the tail portion of the fuselage. These elevator sections are hinged by hinges 22 to horizontal tail-fins 23 of the frame. The elevators are controlled preferably in unison for swinging the same up or down and controlling the direction of flight of the airplane either up or down.

A rudder 25 extends rearwardly from the tail end of the fuselage, and is hinged by hinges 26 to an upright fin 27 and to the body, the fin extending rigidly up and down rearwardly from the rear portion of the fuselage. Means are provided for swinging the rudder to the right or to the left for controlling flight of the airplane either toward the right or toward the left.

An equilibrium member, represented as a seat 31, is provided. This is preferably a seat for the pilot, and is supported in balancing position with relation to the main frame, so that the seat remains in upright position, regardless of the position with relation to the horizontal which may be assumed by the main frame, which may be accomplished by rollers 32 coacting with guideways 33.

The rollers are exemplified as journaled on pivots 34 on the frame 35 of the seat, and the guideways are shown fixed to the main frame or fuselage. The guideways are preferably described on arcs of a circle which has a center above the horizontal plane of the seat, this center being indicated at 36. This center is preferably above the center of gravity of the weight of the equilibrium member, instanced as the occupied seat.

The seat is preferably the seat of the pilot or driver of the airplane. The seat is maintained substantially level, due to the weight and mounting thereof, and the occupation thereof by the driver, although the main frame or fuselage on which it is mounted may be in laterally tilted position. This balancing position of the seat and maintenance thereof in substantially horizontal position influences the operation of the ailerons, in manner to be presently described, for shifting the ailerons in such manner as to cause the main frame of the airplane to be maintained in substantially normal level position during flight, and to avoid deviation from said normal level position during flight.

The guideways 33 are provided with flanges 30, which coact with the rollers to hold the seat to the guideways.

The seat has a ball 37 depending therefrom and secured rigidly thereto. The ball is preferably weighted. This ball is in a cup 38, forming a ball and socket joint. The seat is normally horizontal and the ball depends in vertical position therefrom. The weight of the ball and cup aids in maintaining the seat level, and, if desired, additional weight, as of a body 39 on the seat-frame may aid in maintaining the seat level.

The cup 38 has arms 41, 42, extending therefrom, respectively at its front and at its rear. These arms connect with rods 43, 44, by means of pivots 45, 46. The rods, which are stiff rods, are in turn pivoted by pivots 47, to bell-crank levers 48, which are pivoted by pins 49 to the respective wings, and have articulation by links 50 with horns 51, rigidly conected with and extending from the ailerons on the respective wings, for swinging the ailerons up and down respectively, controlled by the out-of-horizontal relation of the framework of the airplane with relation to the cup 38 and the seat 31.

The links 50 are articulated with the respective bell-crank levers by pivot pins 52 and with the respective horns by a pivot pin 53. The rods 43, 44, may pass through slots 54 of the main frame and slots 55 in the wings.

Springs 61, 62, are respectively connected at one of their ends with the arms 41, 42, and at their other ends with the fuselage, as with posts 63 rigid on the fuselage, for normally holding the arms and the cup connected therewith, so that the arms extend forwardly and rearwardly, and to prevent pivotal movement on an upright axis of the cup about the ball when lateral strains are placed upon said arms by a laterally tilting relation of the wings with relation to the seat, and so that substantially the whole of this lateral tilting relation of the wings is imparted to the ailerons, for adjusting the latter automatically reversely up or down, according to the automatic control transmitted to the ailerons by the out-of-level position of the main frame with relation to the seat.

The seat frame comprises diagonally extending brackets 65, at the front ends of which there are heel-rests 66, which are rigid with the brackets. The seat frame also has a forwardly projecting bracket 67, at the front end of which a rudder-lever 68 is pivoted at 69.

The rudder lever is provided with toe-pieces 71 at its respective ends, which are arranged to be moved by the pilot for controlling rudder connections 72, 73. These connections are usual cables and are fastened at their forward ends to the outer ends of the rudder lever, as at 74, the rear ends of these connections being connected at 75, with horns 76, 77, extending laterally rigidly from the respective sides of the rudder. The cables pass out of holes 78 in the fuselage to the rudder horns.

There is a stick 81 which has a sleeve 82 thereabout, passing through a slot 80 in the seat-frame, the sleeve having a handle 83. In order to connect the sleeve axially with the stick so as to prevent endwise shifting between the same, a pin 84 fixed in the stick is received in an arcuate slot 85 extending partway around the sleeve.

The stick is pivoted to the seat-frame at 88, and the handle 83 of the sleeve is moved forwardly and rearwardly for operating the elevator.

The pivot of the stick is below the level of the seat, as in hangers 87. An arm 89 extends from the stick below its pivot. A link 90, which is a stiff rod, is pivoted at 91 at its forward end to the lower end of the arm 89.

The rear end of the link is connected with an arm 92 by a pivot 93. The arm 92 is fixed to the rocker-rod 94 journaled in bearings 95 in the main body. Arms 96 are fixed to the rocker-rod. The arm 92, the rocker-rod 94 and the arms 96 form a bell-crank lever.

Stiff links 97 are articulated with the arms 96 by pivot-pins 98 and with horns 99 by pivot-pins 100, for swinging the sections of the elevator 21 simultaneously down or up, according to whether the handle 83 is shifted forwardly or rearwardly. The horns 99 are fixed to the sections of the elevator. The arms 92, rocker-rod 94 and arms 96 form a connection for transferring the motion of the single link 90 to the duplicate links 97. The links 97 pass through holes 101 in the fuselage to the horns 99.

The sleeve 82 has arms 105, 106, extending rigidly and diagonally and forwardly therefrom. Cables 107, 108, are attached to the outer ends of these arms. The cables 107, 108, extend respectively about pulleys 109. These pulleys are rotatively mounted on axles 110, on brackets 112 extending from the brackets 65. The cables are crossingly arranged, and the other ends of the cables respectively connect with arms 113, 114, which extend forwardly, diagonally and rigidly from the cup 38 at opposite sides of the vertical median plane of said cup parallel with the length of the fuselage or main frame.

During automatic balancing of the airplane, the arms 113, 114, the cables 107, 108, the arms 105, 106, the stick 81, the sleeve 82, the handle 83 thereon, and the arms 41, 42, maintain their relative normal positions in substantially horizontal and vertical planes with relation to the seat, any out of balance relation of the main frame with relation to the seat being communicated by the pivot-pins 49 of the bell-crank levers 48, and the rods 43, 44, to the respective ailerons for operating the ailerons in order to obtain horizontal travel of the airplane and to maintain the airplane in horizontal position.

The rods 43, 44, preferably extend laterally and upwardly from their inner pivotal points on the arms 41, 42, to their pivotal connections with the bell-crank levers 48, to emphasize the difference in distance between said pivotal connections and said pivotal points, at the respective sides of said pivotal points, when the main frame or fuselage turns on its longitudinal axis with relation to the seat.

During such automatic relation, the pilot has his hand loosely about the handle 83 for steadying the same in forward and rearward position, but permitting the handle 83 to turn readily in his hand, and to move laterally with his hand, if such movements should take place under the influence of the automatic control. This loosely holding of the handle takes place without affecting the level flight of the airplane.

If, however, the pilot should desire to supplement or counteract such automatic control, he may grasp the handle 83 and turn the same, which will rotate the sleeve 82 about its axis, and swing the arms 105, 106, about said axis, for pulling on one cable and relieving the other cable, for causing combined angular movements of the arms 113, 114, and the arms 41, 42, thereby causing endwise movements of the rods 43, 44, in opposite directions, for swinging movements of the ailerons on their pivots in similar directions. (See Figs. 4 and 2).

If the pilot desires to place the ailerons under exclusive manual control, he fixes the position of the seat with relation to the main frame, which may be done by a bolt 118 slidable in a bearing 119 on the seat-frame and received in a socket 120 having a wide mouth 121 for ready reception of the bolt in the socket-piece. The socket is in one of the guideways 33.

The bolt is operated by a handle 122, the shank of which is slidable in a bayonet slot 123. A spring 124 in the bore of the bearing normally presses the bolt into locking position. When the shank of the handle is received in the notch 125 of the bayonet slot, the bolt is held in release relation.

When the seat is fixed with relation to the main frame, the operator can control the ailerons in manual manner, as by rotation of the handle 83 and the sleeve 82, which causes angular movement of the arms 105, 106, and the arms 113, 114, and 41, 42, on the cup 38. When this rotation takes place in one direction, the cable 107 is pulled for rotating the cup 38 in one direction, thereby angularly moving the arms 41, 42, and correspondingly moving the rods 43, 44, axially in opposite directions, for moving one aileron up and the other down. When the handle 83 and the sleeve 82 are rotated in the opposite direction, an opposite effect is produced.

The rudder is normally idle or in normal position parallel with the plane of flight during sustained flight of the airplane in level position. Pressure of the toe portion of the foot of the pilot upon either toe-piece 71, causes swinging of the rudder. The rudder is thus under manual control of the pilot. The connections are so made that the direction of desired flight is controlled by the foot at the side of the direction into which the airplane is intended to be moved. If the pilot desires to travel to the right he presses on the right toe-piece with his right foot, and vice versa.

The arrangement is such that when the pilot desires to descend, he pushes forward on the handle 83 and thereby pushes the upper portion of the stick 81 forwardly, which causes the elevator to droop for causing the airplane to descend. If the pilot desires the airplane to ascend, he pulls rearwardly on the handle 83, which causes the elevator to rise.

If the pilot desires to bank toward the right, he rotates the handle 83 clockwise or with a right hand movement. This has the effect of raising the right aileron and lowering the left aileron. If he desires to bank toward the left, he rotates the handle counter-clockwise, or to the left, for lowering the right aileron and raising the left aileron.

If during the automatic control, the pilot desires to descend or to rise respectively, he may cause the airplane to do so by moving the handle 83 and the upper portion of the stick forwardly or rearwardly, respectively causing the elevator to swing downwardly or upwardly. The pilot when banking may also use the rudder, in practice first manipulating the handle 83, as hereinbefore described, and simultaneously or immediately afterward using the rudder controlling toe-pieces 71.

If the airplane is placed under complete manual control, the pilot may operate it by controlling his ailerons, elevator and rudder with usual effect. Thus he may manually bank and substantially simultaneously use the elevator, it being desired to use the ailerons and the elevator combinedly in banking. The pilot may at the same time use the rudder, or he may use the ailerons and the rudder without using the elevator.

The automatic control has the effect of causing the airplane to fly in balanced condition or on a level keel, that is to say, to have any variations from such balanced or level condition immediately corrected, resulting in sustained balanced flying, or flying with the main frame or fuselage maintained in substantially horizontal position. The automatic control is especially useful when encountering winds or gales, fogs, rains, sleet, storm or snow, and when flying in the dark. Use of the automatic control results in horizontal flying, which is automatically sustained by the mere balanced position of the pilot and equilibrium device.

The balanced position of a passenger, for instance in a similar seat, or of any other stabilizing object, such as a weighted pendulum, which operates in a similar manner, and has similar control connections, will have a similar effect for causing a sustained balanced or horizontal flying, and insuring that the airplane travels right side up and continues to travel right side up. Undue pivotal movements of the main frame or fuselage about an axis projected in the direction of flight are avoided. The use of a bank indicator for such sustained level flight is unnecessary with my improved device, as far as indicating out-of-level postions of the pilot and main frame are concerned.

In operation, the equilibrium member, exemplified as the seat 31, is maintained in level position during the flight of the airplane. If there is a deviation of the main frame or fuselage out of level relation with the seat, a counteracting effect is immediately produced by a counteracting action of the rods 43, 44, upon the ailerons at the respective ends of the wings.

An out-of-level movement of the fuselage causes a shortening of the distance between the pivot of the bell-crank lever which operates one of the ailerons, and the arms 41, 42, with which it connects, and a lengthening of the distance between the pivot of the bell-crank lever connecting with the other aileron and the other arms 41, 42, with which the rod extending from said last-named bell-crank lever connects.

This immediately has the effect of drooping one of the ailerons and raising the other of the ailerons for immediately counteracting the out-of-level condition of the main frame or fuselage. The seat 31 or equilibrium member remains level during flight, and any out-of-level condition of the main frame or fuselage with relation thereto is immediately communicated to the respective ailerons for correcting such out-of-level condition of the main frame or fuselage, and thereby maintaining the airplane in level condition.

My improved device makes the pilot independent of the necessity of manually controlling the airplane for maintaining it in a level postion during flight, and such level condition during flight is maintained without the necessity of control on the part of the pilot.

Necessity for such manual control has heretofore resulted in serious accidents by reason of the fact that the pilot is very often bereft of knowledge of direction of flight or position of the pilot with relation to a horizontal plane or about the axis of the path of travel, especially when flying through fog, rain, sleet, snow or darkness, or under other conditions which make sight or other human sensations uncertain or nullify the same.

It is obvious that changes may be made in the exemplification I have preferred to show and describe, without departing from the spirit of my invention, as enunciated in the following claims.

What I claim as new and desire to secure by Letters Patent, is:

1. In an airplane, the combination of wings, a seat, said wings movable with relation to said seat during flight, means maintaining said seat substantially in upright position by gravity during flight, ailerons for said wings, a ball and socket joint forming a pair of jointed members, one of said members having attachment with and depending from said seat and the other of said members provided with arms, oppositely extending links connecting said respective arms with said respective ailerons, constructed and arranged for counteracting said movements of said wings with relation to said seat, a handle at said seat, and operative connections between said handle and said other of said members for manually controlling said ailerons.

2. In an airplane, the combination of a fuselage, wings thereon, a seat, an arcuate track and guiding means therefor under said seat between said seat and said fuselage arranged for maintaining said seat substantially in upright position by gravity during flight, ailerons for said wings, a ball and socket joint under said seat between said seat and said track and forming a pair of members, one of said members having attachment with said seat and the other of said members having rotative joint connection with said one of said members, arms extending from said other of said members, links between said arms and said ailerons, constructed and arranged for counteracting said movements of said wings with relation to said seat, a rotative handle in front of said seat, and operative connections between said handle and said other of said members for communicating rotative movements of said handle into rotative movements of said other of said members for manual control of said ailerons.

3. In an airplane, the combination of a fuselage, wings thereon, a seat, an arcuate track and guiding means therefor under said seat between said seat and said fuselage arranged for maintaining said seat substantially in upright position by gravity during flight, ailerons for said wings, a ball and socket joint under said seat between said seat and said track and forming a pair of members, one of said members having attachment with said seat and the other of said members having rotative joint connection with said one of said members, arms extending from said other of said members, links between said arms and said ailerons, constructed and arranged for counteracting said movements of said wings with relation to said seat, an elevator pivoted to said fuselage, a pivotally and rotatively mounted handle in front of said seat, operative connections between said handle and said other of said members for communicating rotative movements of said handle into rotative movements of said other of said members for manual control of said ailerons, and a link connection between said handle and said elevator for translating pivotal movements of said handle into pivotal movements of said elevator.

4. In an airplane, the combination of a fuselage, wings thereon, a seat-frame comprising a seat, an arcuate track and guiding means therefor under said seat-frame between said seat-frame and said fuselage arranged for maintaining said seat-frame substantially in upright position by gravity during flight, ailerons for said wings, a ball and socket joint under said seat-frame between said seat-frame and said track and forming a pair of members, one of said members having attachment with said seat-frame and the other of said members having rotative joint connection with said one of said members, arms extending from said other of said members, links between said arms and said ailerons, constructed and arranged for counteracting said movements of said wings with relation to said seat-frame, an elevator pivoted to said fuselage, a pivotally and rotatively mounted handle in front of said seat, operative connections between said handle and said other of said members for communicating rotative movements of said handle into rotative movements of said other of said members for manual control of said ailerons, a link connection between said handle and said elevator for translating pivotal movements of said handle into pivotal movements of said elevator, a treadle-lever pivoted at its middle to said seat-frame, a rudder pivoted to said fuselage, and link connections above said arcuate track between the respective ends of said treadle-lever and the respective sides of said rudder for translating pivotal movements of said lever into pivotal movements of said rudder.

In testimony whereof, I have hereunto signed my name.

HERMAN TROLL.